US008638006B2

(12) United States Patent
Im

(10) Patent No.: US 8,638,006 B2
(45) Date of Patent: Jan. 28, 2014

(54) SEMICONDUCTOR APPARATUS AND METHOD OF TRIMMING VOLTAGE

(75) Inventor: Jae Hyuk Im, Ichon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 526 days.

(21) Appl. No.: 12/966,706

(22) Filed: Dec. 13, 2010

(65) Prior Publication Data

US 2012/0105142 A1 May 3, 2012

(30) Foreign Application Priority Data

Oct. 29, 2010 (KR) ........................ 10-2010-0106804

(51) Int. Cl.
*H02J 1/10* (2006.01)

(52) U.S. Cl.
USPC ........................................................... 307/18

(58) Field of Classification Search
USPC ........................................................... 307/18
See application file for complete search history.

(56) References Cited

U.S. PATENT DOCUMENTS

| | | | |
|---|---|---|---|
| 5,325,045 A | 6/1994 | Sundby | |
| 2002/0057553 A1 | 5/2002 | Jeon et al. | |
| 2008/0204091 A1 * | 8/2008 | Choo et al. | 327/149 |
| 2010/0013307 A1 * | 1/2010 | Heineman et al. | 307/33 |
| 2011/0026293 A1 * | 2/2011 | Riho | 365/63 |

FOREIGN PATENT DOCUMENTS

| | | |
|---|---|---|
| JP | 2002-164492 | 6/2002 |
| JP | 2010033448 A | 2/2010 |
| KR | 1020080092085 A | 10/2008 |
| KR | 100909634 B1 | 7/2009 |
| KR | 1020090100022 A | 9/2009 |

* cited by examiner

*Primary Examiner* — Jared Fureman
*Assistant Examiner* — Duc M Pham
(74) *Attorney, Agent, or Firm* — William Park & Associates Patent Ltd

(57) ABSTRACT

A semiconductor apparatus includes: a master chip and at least one slave chip configured to be stacked one on top of another; and a through-silicon via (TSV) configured to penetrate and electrically couple the master chip and the at least one slave chip, wherein the at least one slave chip receives a reference voltage generated from the master chip via the TSV and independently trims the reference voltage and then generates an internal voltage with the trimmed reference voltage.

9 Claims, 5 Drawing Sheets

SEMICONDUCTOR APPARATUS AND METHOD OF TRIMMING VOLTAGE

CROSS-REFERENCES TO RELATED APPLICATION

The present application claims priority under 35 U.S.C. §119(a) to Korean application number 10-2010-0106804, filed on Oct. 29, 2010 which is incorporated by reference in its entirety as if set forth in full.

BACKGROUND OF THE INVENTION

1. Technical Field

Embodiments relate to a semiconductor apparatus, and more particularly, to a technique for constituting an internal power supply voltage circuit of the semiconductor apparatus having a configuration that a plurality of semiconductor chips are stacked one on top of another.

2. Related Art

A semiconductor apparatus typically receives an external power supply voltage to generate an internal voltage having various voltage levels, and operates an internal circuit of the semiconductor apparatus by using the internal voltage.

FIG. 1 is a block diagram showing a configuration of a power supply voltage generating unit of a typical semiconductor apparatus.

Referring to FIG. 1, the power supply voltage generating unit includes a reference voltage generating unit 1000 and an internal voltage generating unit 2000. The reference voltage generating unit 1000 generates a reference voltage VREF which has a constant level regardless of variations of a power supply voltage VDD applied from outside (i.e., from a pad). The internal voltage generating unit 2000 generates an internal voltage VINT by using the reference voltage VREF. The internal voltage generating unit 2000 is configured to compare the reference voltage VREF with a feedback voltage (not shown) divided from the internal voltage VINT and control the level of the internal voltage VINT based on the comparison result so that the level of the internal voltage VINT can be maintained at a constant level. In other words, the internal voltage generating unit 2000 performs an internal operation so that the level of the internal voltage VINT can reach a target level again if the level of the internal voltage VINT is below or above the target level.

Meanwhile, various package schemes have recently been proposed so as to achieve high integration of a semiconductor apparatus. Specifically, a chip stack scheme that a plurality of semiconductor chips are stacked one on top of another to constitute a single semiconductor apparatus uses a through-chip via so as to commonly transfer a signal to the plurality of semiconductor chips. In general, the through-chip via is referred to as a though-silicon via (TSV) because the semiconductor chip is generally manufactured with a silicon wafer.

In addition, the plurality of stacked semiconductor chips can be classified into a master chip and one or more slave chips. The master chip is configured to perform an operation for communicating a signal with outside and controlling the slave chip. And, the one or more slave chips are each configured to perform a specific operation under the control of the master chip. For example, in case of the semiconductor memory apparatus, the master chip may include a peripheral circuit related to a control signal and an input/output operation of a signal whereas the slave chip may include a memory bank configured to store data. For reference, such a circuit configuration assigned to the master chip and the slave chip can be varied depending on specific needs.

FIG. 2 is a diagram showing a configuration of a typical stacked semiconductor apparatus.

Referring to FIG. 2, the typical stacked semiconductor apparatus includes a master chip MASTER CHIP and a plurality of slave chips SLAVE CHIP1 to SLAVE CHIP4. The master chip MASTER CHIP and the plurality of slave chips SLAVE CHIP1 to SLAVE CHIP4 are staked one on top of another, and a plurality of through-silicon vias (TSVs) 101, 102, 103 and 104 are penetrating and coupling the master chip MASTER CHIP and the plurality of slave chips SLAVE CHIP1 to SLAVE CHIP4 together. For convenience of description, a plurality of sub through-silicon vias (TSVs) vertically penetrating the respective semiconductor chips will be referred to as a single through-silicon via (TSV) hereinafter.

The semiconductor apparatus including the master chip MASTER CHIP and the plurality of slave chips SLAVE CHIP1 to SLAVE CHIP4 has a configuration that a power supply voltage circuit and the peripheral circuit are concentrated in the master chip MASTER CHIP so as to secure a net die.

Therefore, as shown in FIG. 2, the master chip MASTER CHIP includes a reference voltage generating unit 11, a reference voltage trimming unit 12, and an internal voltage generating unit 13, and transfers an internal voltage VINT generated in the internal voltage generating unit 13 to the plurality of slave chips SLAVE CHIP1 to SLAVE CHIP4 through the plurality of TSVs 101, 102, 103 and 104. The plurality of slave chips SLAVE CHIP1 to SLAVE CHIP4 respectively perform an internal operation by using the internal voltage VINT transferred via the plurality of TSVs 101, 102, 103 and 104. In other words, first and second logic units included in the respective slave chips SLAVE CHIP1 to SLAVE CHIP4 perform the internal operation by using the internal voltage VINT generated in the master chip MASTER CHIP as an operation power supply voltage.

The reference voltage trimming unit 12 trims a reference voltage VREF0 generated from the reference voltage generating unit to output a trimmed reference voltage VREF. Operation characteristics of the internal circuit of the semiconductor apparatus can be varied due to a variation of process, voltage and temperature (PVT). Specifically, due to the variation of the process, a level of the reference voltage VREF0 generated from the reference voltage generating unit 11 or a level of the internal voltage VINT may deviate from a target level. Specifically, since the reference voltage VREF0 is a main factor that determines a reference level in the internal power supply voltage circuit, a role of the reference voltage trimming unit 12 configured to trim the reference voltage VREF0 is very important.

Meanwhile, the respective slave chips SLAVE CHIP1 to SLAVE CHIP4 of the semiconductor apparatus of FIG. 2 receive the internal voltage VINT generated from the master chip MASTER CHIP via the plurality of TSVs 101, 102, 103 and 104, and use the internal voltage VINT as the operation power supply voltage of the internal logic unit. At this time, since the plurality of slave chips SLAVE CHIP1 to SLAVE CHIP4 can have different characteristics from each other due to the variation of the process, a level of the internal voltage VINT that enables the respective slave chips SLAVE CHIP1 to SLAVE CHIP4 to operate optimally may also be different from each other. However, since the semiconductor apparatus of FIG. 2 commonly transfers the internal voltage VINT generated from the master chip MASTER CHIP to the plurality of slave chips SLAVE CHIP1 to SLAVE CHIP4, it is difficult to generate an optimal and common internal voltage VINT that can thoroughly compensate the variation of the process of the respective slave chips SLAVE CHIP1 to SLAVE CHIP4.

SUMMARY OF THE INVENTION

Accordingly, there is a need for an semiconductor apparatus capable of independently trimming an internal power supply voltage of a plurality of stacked semiconductor chips. It should be understood, however, that some aspects of the invention may not necessarily obviate the above-mentioned problem.

In the following description, certain aspects and embodiments will become evident. It should be understood that these aspects and embodiments are merely exemplary, and the invention, in its broadest sense, could be practiced without having one or more features of these aspects and embodiments.

In one exemplary embodiment of the invention, a semiconductor apparatus includes: a master chip and at least one slave chip configured to be stacked one on top of another; and a through-silicon via (TSV) configured to penetrate and electrically couple the master chip and the at least one slave chip, wherein the at least one slave chip receives a reference voltage generated from the master chip via the TSV and independently trims the reference voltage and then generates an internal voltage with the trimmed reference voltage.

In another exemplary embodiment of the invention, a semiconductor apparatus includes a through-silicon via (TSV) configured to penetrate and electrically couple a master chip and at least one slave chip, wherein the master chip includes: a reference voltage generating unit configured to generate a reference voltage and transfer the reference voltage to the TSV; a first reference voltage trimming unit configured to trim the reference voltage to output a first trimmed reference voltage; and a first internal voltage generating unit configured to generate an internal voltage by using the first trimmed reference voltage, and wherein the plurality of slave chips each includes: a second reference voltage trimming unit configured to trim the reference voltage transferred via the TSV to output a second trimmed reference voltage; and a second internal voltage generating unit configured to generate an internal voltage by using the second trimmed reference voltage and output the internal voltage to an internal power supply voltage line.

In still another exemplary embodiment of the invention, a voltage trimming method of a semiconductor apparatus, which includes a through-silicon via (TSV) configured to penetrate and electrically couple a master chip and at least one slave chip, comprises: transferring a reference voltage generated from the master chip via the TSV; independently trimming the reference voltage transferred via the TSV to generate at least one trimmed reference voltage in the at least one slave chip, respectively; and generating at least one internal voltage used in the at least one slave chip by using the at least one trimmed reference voltage, respectively.

BRIEF DESCRIPTION OF THE DRAWINGS

The accompanying drawings, which are incorporated in and constitute a part of this specification, explain various embodiments consistent with the invention and, together with the description, serve to explain the principles of the invention.

DETAILED DESCRIPTION

Figure 1:
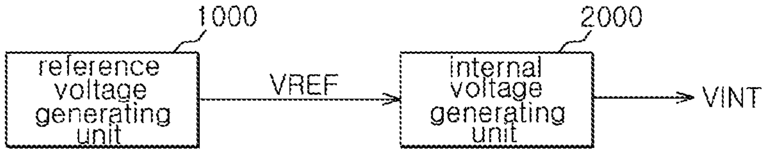
FIG. 1 is a block diagram showing a configuration of a power supply voltage generating unit of a typical semiconductor apparatus.

Reference will now be made in detail to the exemplary embodiments consistent with the present disclosure, examples of which are illustrated in the accompanying drawings. Wherever possible, the same reference characters will be used throughout the drawings to refer to the same or like parts.

Figure 3:
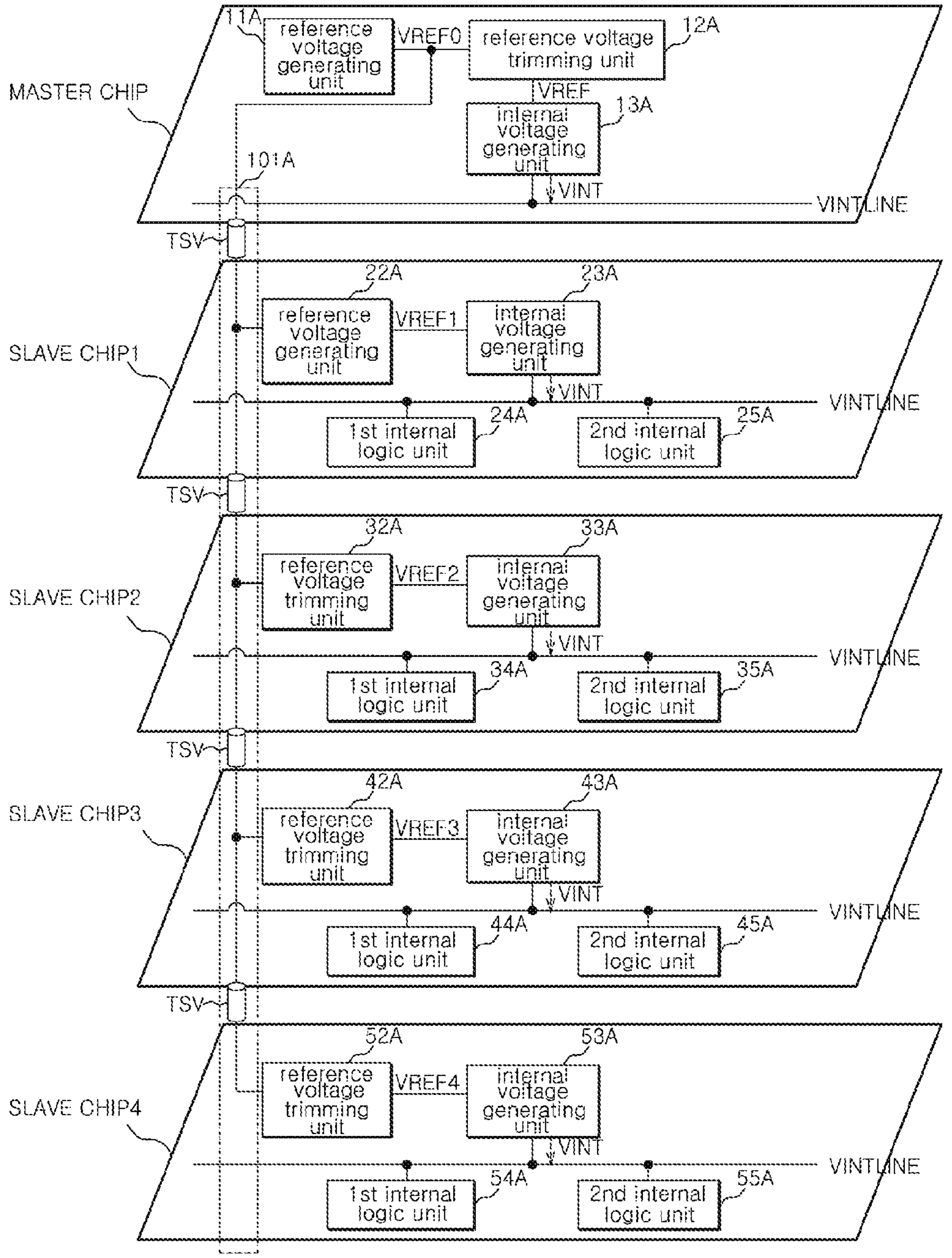
FIG. 3 is a diagram showing a configuration of a semiconductor apparatus according to the embodiment.

FIG. 3 is a diagram showing a configuration of a semiconductor apparatus according to one embodiment.

The semiconductor apparatus in accordance with the present embodiment includes only a simplified configuration for the sake of clear description.

Figure 2:
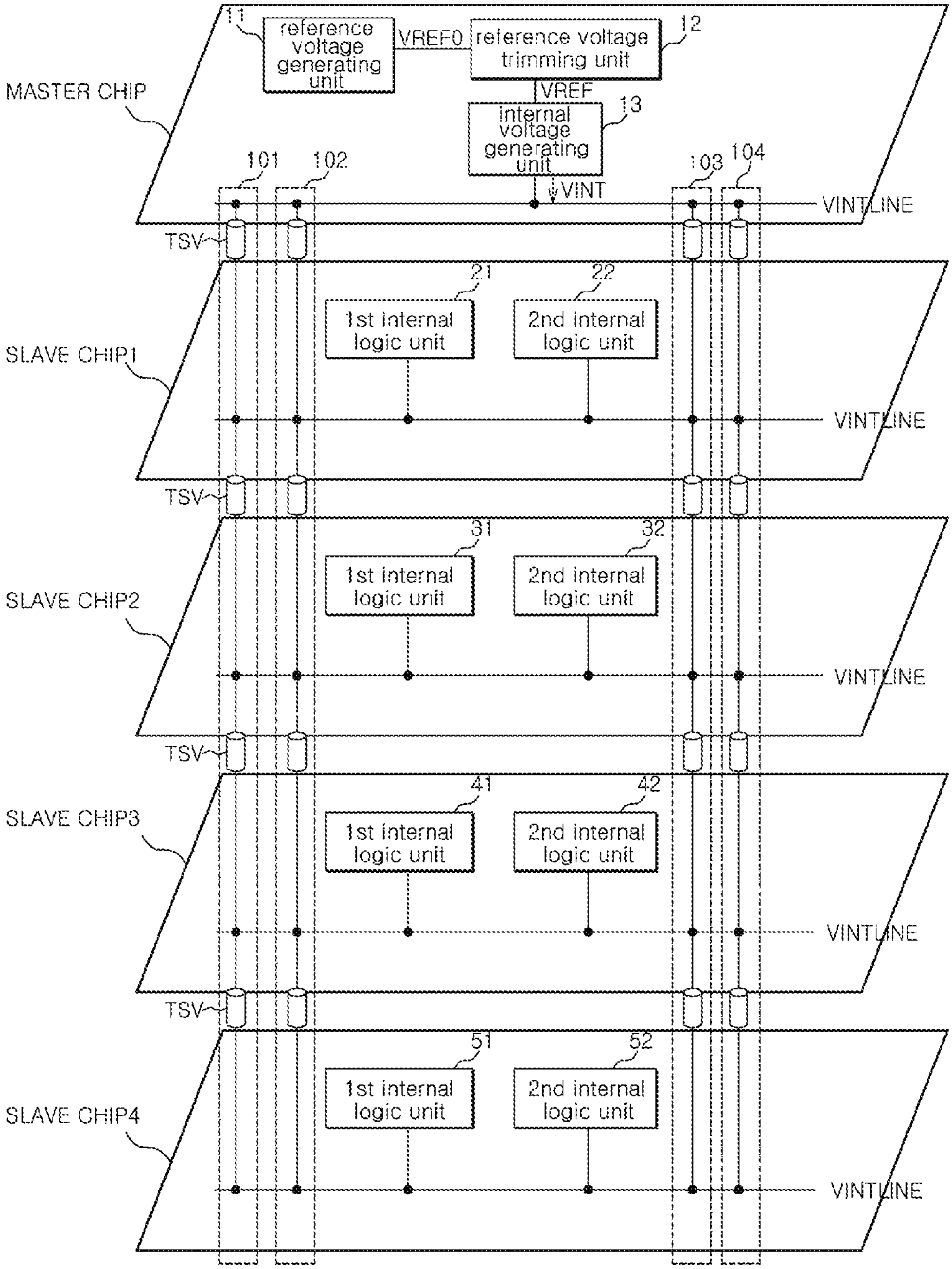
FIG. 2 is a diagram showing a configuration of a typical stacked semiconductor apparatus.

Referring to FIG. 3, the semiconductor apparatus includes a master chip MASTER CHIP and a plurality of slave chips SLAVE CHIP1 to SLAVE CHIP4. The master chip MASTER CHIP and the plurality of slave chips SLAVE CHIP1 to SLAVE CHIP4 are vertically stacked one on top of another, and a through-silicon via (TSV) 101A is penetrating and electrically coupling the master chip MASTER CHIP and the plurality of slave chips SLAVE CHIP1 to SLAVE CHIP4. For convenience of description, a plurality of sub through-silicon vias (TSVs) vertically penetrating the respective semiconductor chips will be referred to as a single through-silicon via (TSV). In addition, a plurality of through-silicon vias (TSVs) are formed in the single semiconductor apparatus (e.g., refer to 101 to 104 of FIG. 2), but only the single through-silicon via (TSV) 101A is shown in FIG. 3 for convenience of drawings.

In the embodiment, the respective slave chips SLAVE CHIP1 to SLAVE CHIP4 receive the reference voltage VREF0 generated from the master chip MASTER CHIP via the TSV 101A. In addition, the plurality of slave chips SLAVE CHIP1 to SLAVE CHIP4 independently trims the reference voltage VREF0, respectively, and afterwards generates the internal voltage VINT with trimmed reference voltages VREF1, VREF2, VREF3 and VREF4, respectively. Therefore, even though the plurality of slave chips SLAVE CHIP1 to SLAVE CHIP4 have different characteristics from each other due to the variation of the process, the respective slave chips SLAVE CHIP1 to SLAVE CHIP4 can independently trim the reference voltage VREF0, thereby capable of independently generating the internal voltage VINT that enables the respective slave chips SLAVE CHIP1 to SLAVE CHIP4 to obtain optimal operation characteristics.

A detailed configuration and a main operation of the above-mentioned semiconductor apparatus will now be described in detail.

As shown in FIG. 3, the master chip MASTER CHIP includes a reference voltage generating unit 11A, a reference voltage trimming unit 12A, and an internal voltage generating unit 13A. The reference voltage generating unit 11A generates the reference voltage VREF0, and then transfers the reference voltage VREF0 to the TSV 101A. The reference voltage trimming unit 12A trims the reference voltage VREF0 to output the trimmed reference voltage VREF. The internal voltage generating unit 13A generates the internal voltage VINT by using the trimmed reference voltage VREF. At this time, it is preferable that a voltage level of the trimmed reference voltage VREF is adjusted to a level that enables an internal circuit of the master chip MASTER CHIP to operate optimally. In other words, that the trimmed reference voltage VREF is adjusted means that a voltage level of the internal voltage VINT is controlled to optimize an operation of an internal logic unit which uses the internal voltage VINT as an operation power supply voltage. For reference, the internal voltage generating unit 13A can generate the internal voltage VINT with a regulating scheme or a charge pumping scheme.

Meanwhile, since the plurality of slave chips SLAVE CHIP1 to SLAVE CHIP4 have substantially the same circuit configuration as each other, an internal operation of the first slave chip SLAVE CHIP1 and an internal circuit related thereto will now be described as a representative example.

The first slave chip SLAVE CHIP1 includes a reference voltage trimming unit 22A, an internal voltage generating unit 23A, first and second internal logic units 24A and 25A, and an internal power supply voltage line VINT LINE. Here, it is preferable that the internal voltage generating unit 23A is positioned at a place near the first and second internal logic units 24A and 25A.

The reference voltage trimming unit 22A trims the reference voltage VREF0 transferred via the TSV 101A to output the trimmed reference voltage VREF1. The internal voltage generating unit 23A generates the internal voltage VINT by using the trimmed reference voltage VREF1, and then outputs the internal voltage VINT to the internal power supply voltage line VINT LINE. At this time, it is preferable that a voltage level of the trimmed reference voltage VREF1 is adjusted to a level that enables an internal circuit of the first slave chip SLAVE CHIP1 to operate optimally. In other words, that the trimmed reference voltage VREF1 is adjusted means that a voltage level of the internal voltage VINT is controlled to optimize an operation of the first and second internal logic units 24A and 25A which use the internal voltage VINT as an operation power supply voltage. For reference, the internal voltage generating unit 23A can generate the internal voltage VINT with the regulating scheme or the charge pumping scheme.

A voltage trimming method of the above-described semiconductor apparatus, i.e., the semiconductor apparatus including a through-silicon via (TSV) penetrating and electrically coupling a master chip and a plurality of slave chips which are stacked one on top of another, includes: transferring a reference voltage generated from a master chip via the TSV; independently trimming the reference voltage transferred via the TSV to generate a plurality of trimmed reference voltages in the plurality of slave chips, respectively; and generating a plurality of internal voltages which are used in the plurality of slave chips by using the plurality of trimmed reference voltages, respectively. At this time, it is noted that a plurality of internal voltages which can optimize an operation of the plurality of semiconductor chips, respectively, can be generated, because the plurality of semiconductor chips have different operation characteristics from each other due to a variation of the process.

Figure 4:
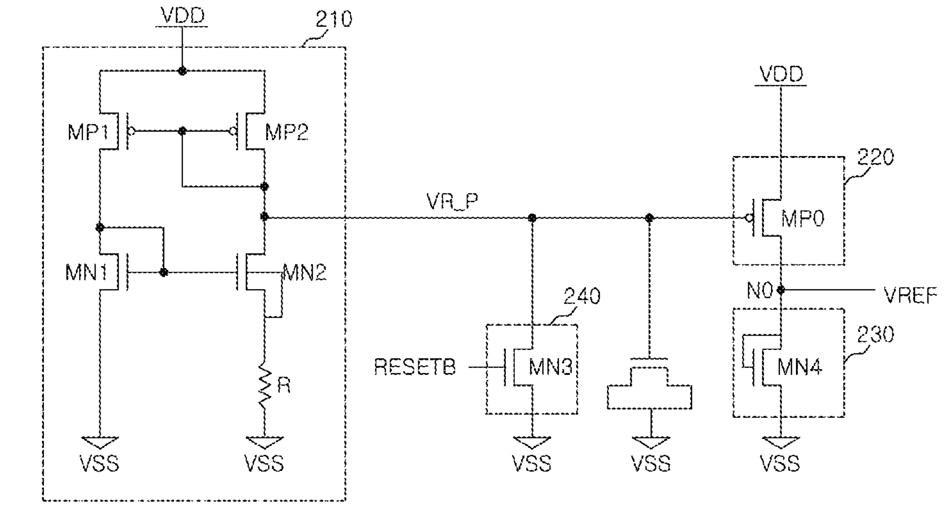
FIG. 4 is a diagram showing a configuration of a reference voltage generating unit according to the embodiment.

FIG. 4 is a diagram showing a configuration of a reference voltage generating unit according to the embodiment.

Referring to FIG. 4, the reference voltage generating unit includes a control voltage output unit 210, a pull-up driving unit 220, a loading unit 230, and an initialization unit 240.

The control voltage output unit 210 outputs a control voltage VR_P having a level corresponding to a voltage level of an external power supply voltage VDD. Since the control voltage output unit 210 includes a temperature compensation unit R, the control voltage output unit 210 generates the control voltage VR_P which has a minimal voltage variation against temperature variations.

The pull-up driving unit 220 pulls up a reference voltage output terminal N0 with a current amount corresponding to a voltage difference between the control voltage VR_P and the external power supply voltage VDD. At this time, the pull-up driving unit 220 drives and outputs a constant current to the reference voltage output terminal N0 regardless of variations of the external power supply voltage VDD.

The loading unit 230 is coupled between the reference voltage output terminal N0 and a ground voltage terminal VSS, and forms a reference voltage VREF having a level corresponding to its resistance value at the reference voltage output terminal N0. In other words, assuming that the pull-up driving unit 220 has a substantially constant resistance value, the voltage level of the reference voltage VREF which is formed in the reference voltage output terminal N0 is determined based on the resistance value of the loading unit 230.

The initialization unit 240 initializes the voltage level of the control voltage VR_P to the ground voltage (VSS) level under control of a reset signal 'RESETB'. For reference, the reset signal 'RESETB' can be generated using a power-up signal which indicates that the power supply voltage is initialized.

Figure 5:
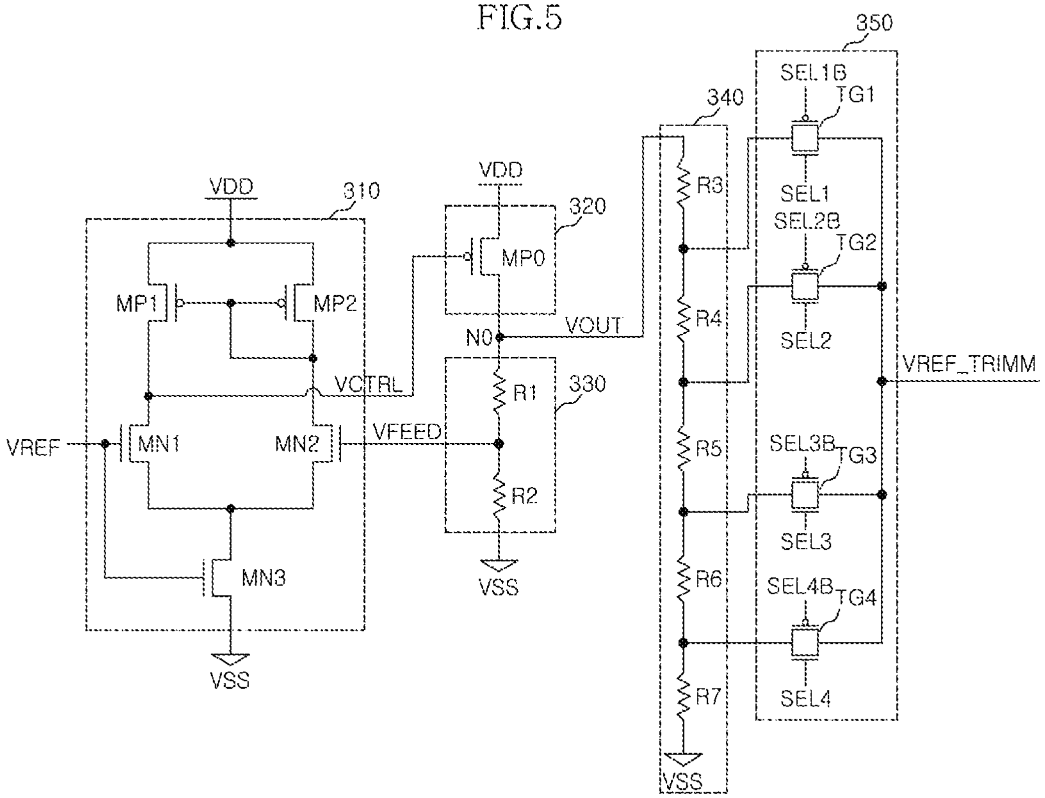
FIG. 5 is a diagram showing a configuration of a reference voltage trimming unit according to the embodiment.

FIG. 5 is a diagram showing a configuration of a reference voltage trimming unit according to the embodiment.

Referring to FIG. 5, the reference voltage trimming unit includes a comparison unit 310, a pull-up driving unit 320, a feedback unit 330, a voltage division unit 340, and a selection unit 350.

The comparison unit 310 compares the reference voltage VREF with a feedback voltage VFEED, and outputs a control voltage VCTRL having a voltage level corresponding to the comparison result. The pull-up driving unit 320 pulls up a voltage output terminal N0 under control of the control voltage VCTRL. The feedback unit 330 is coupled between the voltage output terminal N0 and the ground voltage terminal VSS, and outputs the feedback voltage VFEED. In the embodiment, the feedback unit 330 comprises a plurality of voltage drop elements R1 and R2 which are interposed between the voltage output terminal N0 and the ground voltage terminal VSS and are coupled in series with each other. Therefore, a voltage level of the feedback voltage VFEED is adjusted based on a resistance ratio of the plurality of voltage drop elements R1 and R2.

The voltage division unit 340 divides an output voltage VOUT outputted from the voltage output terminal N0 to output a plurality of divided voltages having a different level from one another. In the embodiment, the voltage division unit 340 comprises a plurality of voltage drop elements R3 to R7 which are interposed between the voltage output terminal N0 and the ground voltage terminal VSS and are coupled in series with one another, and the divided voltage is outputted from one terminal of the respective voltage drop elements R3 to R7. The selection unit 350 selectively outputs one of the plurality of divided voltages as a trimmed reference voltage VREF_TRIMM under control of trimming control codes 'SEL<1:4>'. Here, the trimming control codes 'SEL<1:4>' can be generated using a signal provided from a Mode Register Set (MRS) or a signal outputted from a fuse set.

Figure 6:
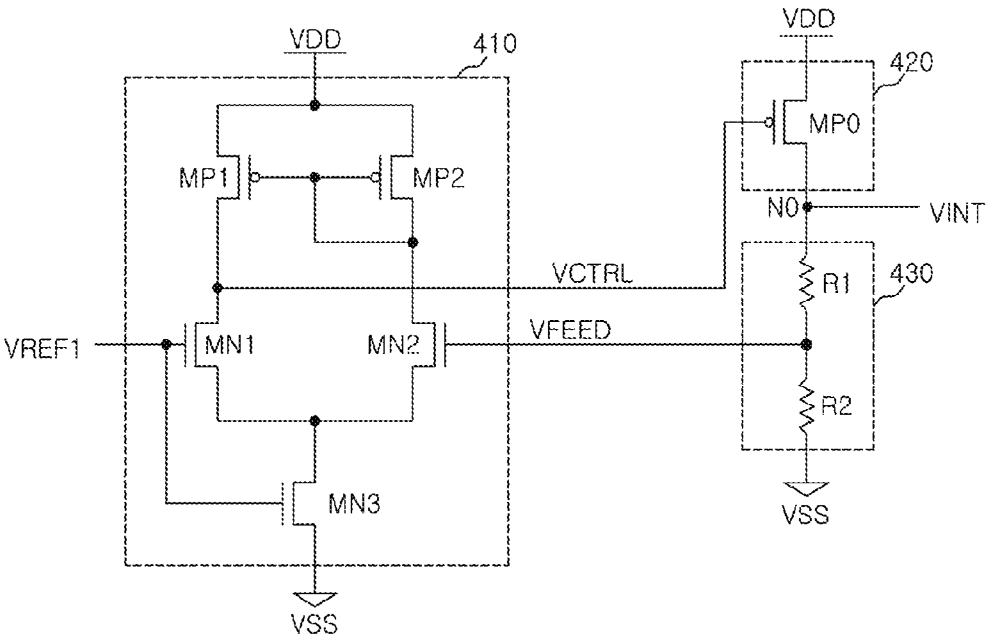
FIG. 6 is a diagram showing a configuration of an internal voltage generating unit according to the embodiment.

FIG. 6 is a diagram showing a configuration of an internal voltage generating unit according to the embodiment.

Referring to FIG. 6, the internal voltage generating unit includes a comparison unit 410, a pull-up driving unit 420, and a feedback unit 430.

The comparison unit 410 compares a trimmed reference voltage VREF1 with a feedback voltage VFEED, and outputs a control voltage VCTRL having a voltage level corresponding to the comparison result. The pull-up driving unit 420 pulls up an internal voltage output terminal N0 under control of the control voltage VCTRL. The feedback unit 430 is coupled between the internal voltage output terminal N0 and the ground voltage terminal VSS, and outputs the feedback voltage VFEED. In the embodiment, the feedback unit 430 comprises a plurality of voltage drop elements R1 and R2 which are interposed between the internal voltage output terminal N0 and the ground voltage terminal VSS and are coupled in series with each other. Therefore, a voltage level of the feedback voltage VFEED is adjusted based on a resistance ratio of the plurality of voltage drop elements R1 and R2.

Since the voltage level of the feedback voltage VFEED is varied if the level of the internal voltage VINT is below or above the target level, the voltage level of the control voltage VCTRL outputted from the comparison unit 410 is adjusted. At this time, the voltage level of the control voltage VCTRL is adjusted until the level of the internal voltage VINT reaches the target level again. For reference, in the embodiment, the internal voltage generating unit employing the regulating scheme is used as an example, but another internal voltage generating unit employing the charge pumping scheme can also be used in some alternative implementations.

As such, the present invention has been described with respect to the specific embodiments. For instance, although it is not directly related to a technical spirit of the present invention, an embodiment including additional construction may be illustrated to explain the present invention in detail. Furthermore, the construction of active high or active low representing the active state of a signal or circuit can be changed according to embodiments. In addition, the construction of transistors to implement the same function can be changed according to needs. That is, the construction of PMOS transistors may be replaced with that of PMOS transistors and various transistors can be used according to needs. Since there are various changes and modifications of the circuit and they are apparent to those skilled in the art, their listing is omitted herefrom.

While certain embodiments have been described above, it will be understood to those skilled in the art that the embodiments described are by way of example only. Accordingly, the device and method described herein should not be limited based on the described embodiments. Rather, the apparatus described herein should only be limited in light of the claims that follow when taken in conjunction with the above description and accompanying drawings.

What is claimed is:

1. A semiconductor apparatus comprising:

a master chip and at least one slave chip configured to be stacked one on top of another; and a through-silicon via (TSV) configured to penetrate and electrically couple the master chip and the at least one slave chip, wherein the at least one slave chip receives a reference voltage generated from the master chip via the TSV and independently trims the reference voltage and then generates an internal voltage with the trimmed reference voltage, wherein the master chip includes a reference voltage generating unit, and the reference voltage generating unit includes:

a control voltage output unit configured to output a control voltage configured to have a level corresponding to a level of an external power supply voltage;

a pull-up driving unit configured to pull up a reference voltage output terminal with a current amount corresponding to a voltage difference between the control voltage and the external power supply voltage; and a loading unit configured to be coupled between the reference voltage output terminal and a ground voltage terminal and form the reference voltage configured to have a level corresponding to its resistance value at the reference voltage output terminal.

2. A semiconductor apparatus comprising a through-silicon via (TSV) configured to penetrate and electrically couple a master chip and at least one slave chip, wherein the master chip comprises:

a reference voltage generating unit configured to generate a reference voltage and transfer the reference voltage to the TSV;

a first reference voltage trimming unit configured to trim the reference voltage to output a first trimmed reference voltage; and a first internal voltage generating unit configured to generate an internal voltage by using the first trimmed reference voltage, and wherein each of the at least one slave chip comprises:

a second reference voltage trimming unit configured to trim the reference voltage transferred via the TSV to output a second trimmed reference voltage; and a second internal voltage generating unit configured to generate an internal voltage by using the second trimmed reference voltage and output the internal voltage to an internal power supply voltage line, wherein the reference voltage generating unit includes:

a control voltage output unit configured to output a control voltage configured to have a level corresponding to a level of an external power supply voltage;

a pull-up driving unit configured to pull up a reference voltage output terminal with a current amount corresponding to a voltage difference between the control voltage and the external power supply voltage; and a loading unit configured to be coupled between the reference voltage output terminal and a ground voltage terminal and form the reference voltage configured to have a level corresponding to its resistance value at the reference voltage output terminal.

3. The semiconductor apparatus of claim 2, wherein the at least one slave chip further includes one or more internal logic units configured to perform an internal operation by using the internal voltage of the internal power supply voltage line as an operation power supply voltage.

4. The semiconductor apparatus of claim 2, wherein the first and second reference voltage trimming units each includes:

a comparison unit configured to compare the reference voltage with a feedback voltage and output a control voltage configured to have a voltage level corresponding to the comparison result;

a pull-up driving unit configured to pull up a voltage output terminal under control of the control voltage;

a feedback unit configured to be coupled between the voltage output terminal and a ground voltage terminal and output the feedback voltage;

a voltage division unit configured to divide an output voltage outputted from the voltage output terminal to output a plurality of divided voltages each configured to have a different level from each other; and a selection unit configured to selectively output one of the plurality of divided voltages as the trimmed reference voltage under control of a trimming control code.

5. The semiconductor apparatus of claim 4, wherein the feedback unit includes a plurality of voltage drop elements configured to be coupled in series with each other between the voltage output terminal and the ground voltage terminal.

6. The semiconductor apparatus of claim 4, wherein the trimming control code is a signal configured to be provided from a Mode Register Set (MRS).

7. The semiconductor apparatus of claim 4, wherein the trimming control code is a signal configured to be outputted from a fuse set.

8. The semiconductor apparatus of claim 2, wherein the first and second internal voltage generating units each includes:

a comparison units configured to compare the trimmed reference voltage with a feedback voltage to output a control voltage configured to have a voltage level corresponding to the comparison result;

a pull-up driving unit configured to pull up an internal voltage output terminal under control of the control voltage; and a feedback unit configured to be coupled between the internal voltage output terminal and the ground voltage terminal and output the feedback voltage.

9. The semiconductor apparatus of claim 8, wherein the feedback unit includes a plurality of voltage drop elements configured to be coupled in series with each other between the internal voltage output terminal and the ground voltage terminal.

* * * * *